3,249,629
POLYAMIDE OF POLYMERIC FAT ACIDS AND 1,3 OR 1,4-CYCLOHEXANE BIS(METHYL-AMINE)
Edgar R. Rogier, Hopkins, Minn., assignor to General Mills, Inc., a corporation of Delaware
No Drawing. Filed Mar. 15, 1963, Ser. No. 265,347
3 Claims. (Cl. 260—404.5)

This invention relates to high molecular weight polyamide compositions of greatly improved toughness (high tensile strength and high elongation) and surprising resistance to water absorption. More particularly, it relates to polyamide resins prepared from fractionated polymeric fat acids and 1,3 or 1,4-cyclohexane bis(methylamine).

Polyamide resins of polymeric fat acids are well known. Such polyamide resins, however, present little if any elongation. In addition, such resins possess little toughness. While some degree of flexibility was achieved by various methods, such gain in flexibility was at the expense of other properties.

It has now been discovered, however, that homopolymer polyamide resins can be prepared which can have excellent toughness properties combined with surprising resistance to water absorption. These polyamides having this unexpected combination of properties have been found to result from the reaction of fractionated polymeric fat acids with cyclohexane bis(methylamine).

It is therefore an object of this invention to provide polyamide compositions having improved toughness.

It is also an object of this invention to provide polyamide compositions which have surprising resistance to water absorption.

It is also an object of this invention to provide such compositions utilizing fractionated polymeric fat acids and cyclohexane bis(methylamine).

Briefly, the polyamide compositions of the present invention are prepared by reacting the fractionated polymeric fat acids with cyclohexane bis(methylamine). The time and temperature of reaction may be varied over a considerable range but is usually from 150–300° C. for a period of ½ to 8 hours, the longer period being employed at the lower temperatures. Essentially one molar equivalent of amine is employed per molar equivalent of carboxyl group present.

The polymeric fat acids employed in this invention are fractionated polymeric fat acids having an excess of about 95% of the dimeric species. The term "polymeric fat acids" as used herein is intended to be generic to polymerized acids obtained from "fat acids". The term "fat acids" is intended to include saturated, ethylenically unsaturated and acetylenically unsaturated, naturally occurring and synthetic, monobasic, aliphatic acids obtaining from 8 to 24 carbon atoms.

The saturated, ethylenically unsaturated and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures with a peroxidic catalyst such as di-t-butyl peroxide. Because of the generally low yields of polymeric products, these materials are not currently commercially significant. Suitable saturated fat acids include branched and straight chain acids such as caprylic acid, pelargonic acid, capric acid, lauric acid, myristic acid, palmitic acid, isopalmitic acid, stearic acid, arachidic acid, behenic acid and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthraquinone, sulfur dioxide and the like. Suitable monomers include the branched and straight chain, poly- and mono-ethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, eleostearic acid, hiragonic acid, moroctic acid, timnodonic acid, eicosatetraenoic acid, nisinic acid, scoliodonic acid and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight chain and branched chain, both mono-unsaturated and poly-unsaturated, are useful monomers for the preparation of the polymeric acids. Suitable examples of such materials include 10-undecynoic acid, tariric acid, stearolic acid, behenolic acid and isamic acid.

Because of their ready availability and relative ease of polymerization, oleic and linoleic acid are the preferred starting materials for the preparation of the polymeric fat acids.

It is understood that there may also be employed such other derivatives capable of forming amides in a reaction with a diamine, such as the lower alcohol (alkyl having 1 to 8 carbon atoms) esters of polymeric fat acids.

Having obtained the polymeric fat acids or derivatives as described above, they may then be fractionated, for example, by conventional techniques of distillation or solvent extraction. They may be hydrogenated (before or after distillation) to reduce unsaturation under hydrogen pressure in the presence of a hydrogenation catalyst. Where color and stability of the polymer is particularly important, hydrogenated and fractionated polymeric fat acids are the preferred starting materials.

Typical compositions of commercially available polymeric fat acids, based on unsaturated $C_{18}$ fat acids, are:

$C_{18}$ monobasic acids ("monomer") 5–15% by weight;
$C_{36}$ dibasic acids ("dimer") 60–80% by weight;
$C_{54}$ (and higher) ("trimer") polybasic acids 10–35% by weight.

The relative ratios of monomer, dimer and trimer (or higher) in fractionated polymeric fat acids are dependent on the nature of the starting material and the conditions of polymerization. For the purposes of this invention, the term monomeric fat acids refers to the unpolymerized monomeric acids or derivatives present in the polymeric fat acids; the term dimeric fat acids refers to the dimeric acids or derivatives (formed by the dimerization of two fat acid molecules); and the term trimeric fat acids refers to the residual higher polymeric forms consisting primarily of trimeric acids or derivatives, but containing some higher polymeric forms.

For the purposes of this invention, the terms monomeric, dimeric and trimeric fat acids, are defined further by a micromolecular distillation analytical method. The method is that of R. E. Paschke, et al., "J. Am. Oil Chem. Soc." XXXI (No. 1) 5, (1954), wherein the distillation is carried out under high vacuum (below 5 microns) and the monomeric fraction is calculated from the weight of products distilling at 155° C., the dimeric fraction is calculated from that distilling between 155° C. and 250° C., and the trimer (or higher) fraction is calculated based on the residue.

Mixtures may be fractionated by suitable means such as high vacuum distillation or solvent extraction techniques so as to obtain dimer acid cuts of greater than about 95% dimeric species by weight. It is these dimer-rich fractions which are the starting materials for the copolyamides of the present invention.

In addition to controlling the dimer (difunctional) species content of the polymeric fat acids of the present invention, careful control must also be exercised as to the monomeric (monofunctional) species and trimeric (trifunctional) (or higher) species content. Polyamides prepared with polymeric fat acids having too high a trifunctional content can be nearly intractable, exhibiting the extremely high melt viscosities and/or insoluble gels typical of a cross-linked polymer. It is well known that monofunctional species will decrease this gelation. However, polyamides prepared with polymeric fat acids having too high a monofunctional species content can be quite poor in physical characteristics (low elongation, low tensile strength) as is typical of a low molecular weight polymer resulting from the reaction of a monomeric "chain-stopping" component. Hence careful control of both monofunctional and trifunctional species is necessary to obtain optimum products.

The diamines which are employed in the present invention are 1,4-cyclohexane bis(methylamine) and 1,3-cyclohexane bis(methylamine).

The mechanical properties of direct interest in the compositions of the present invention are tensile strength and elongation. These properties are measured on an Instron Tensile Tester Model TTC using ASTM 1708–59T.

The polymer is compression molded as a 6″ x 6″ sheet of approximately 0.04 inch thickness, at a temperature near its melting point (usually a few degrees lower than the melting point) and at 40,000 lbs. load or higher using cellophane as the parting agent in the mold. From this sheet, test specimens are die-cut to conform to ASTM 1708–59T.

The test specimen is clamped in the jaws of the Instron Tester. Crosshead speed is usually 0.5 inch/minute at 100 pound full scale load. Chart speed is 0.5 inch/minute. Tensile strength (reference: ATSM D-638-52T) is calculated as:

$$\text{Tensile strength} = \frac{\text{maximum load in pounds}}{\text{cross sectional area (sq. in.)}}$$

Percent elongation is calculated as:

Percent elongation =
$$\frac{\text{gage length at break} - \text{gage length at 0 load}}{\text{gage length at 0 load}} \times 100$$

In addition to tensile strength and elongation, the following properties were measured on most of the polymers prepared:

(1) Ball and ring softening point—ASTM E28–58T.
(2) Amine and acid end groups—conventional analytical titration procedures. These results are expressed in terms of milliequivalents of amine or acid per kilogram of product (meq./kg.).
(3) Inherent viscosity—defined by equation:

$$\eta \text{ inh.} = \frac{\ln \eta \text{ rel}}{C}$$

where $C$=concentration of polymer in grams per 100 ml. of solvent, $\ln \eta$ rel=natural logarithm of the relative viscosity of the dilute polymer solution. In the examples below all viscosities are measured in m-cresol at 30° C., usually at a concentration of 1.0 g./100 ml.
(4) Tensile modulus—as defined at ASTM D638–60T.
(5) Toughness—This is taken as the area under the stress-strain curve. Cf. Carswell & Nason, Symposium on Plastics, ASTM, Philadelphia, February 1944, p. 23.
(6) Water absorption—as defined in ASTM D570–59aT.

The following examples will serve to further illustrate the invention. All parts and percentages are by weight unless specifically noted otherwise.

*Example I*

Into a stainless steel reactor equipped with a stirrer, thermocouple and a pressure relief valve set for 150 p.s.i.g. was placed 495.25 grams (1.75 equivalents) of distilled polymeric fat acids (prepared from tall oil fat acids) having the following analysis:

| | |
|---|---|
| Percent M (monomer) | 1.1 |
| Percent D (dimer) | 98.4 |
| Percent T (trimer) | 0.5 |
| Saponification equivalent (S.E.) | 284 |
| Neutralization equivalent (N.E.) | 288 | and 124.40 grams (1.75 equivalents) of 1,4-cyclohexane-bis(methylamine).

The mixture was heated 0.33 hour at 30–160° C., 1.7 hours at 160–250° C., and 2.25 hours under vacuum (ca.<1 mm. Hg) at 250° C. The resulting polyamide had the following properties:

| | |
|---|---|
| Amine _____ meq./kg __ | 28.4 |
| Acid _____ meq./kg __ | 45.8 |
| Ball and ring melting point ° C. | 152 |
| Inherent viscosity | 0.59 |
| Elongation percent | 380 |
| Tensile strength (p.s.i.) | 4,800 |
| Tensile modulus (p.s.i.) | 39,084 |

The water absorption properties of the homopolymer were studied with the following results:

| Time: | Water absorption, 25° C. |
|---|---|
| 24 hours | 0.17 |
| 1 week | --- |
| 2 weeks | 0.67 |
| 3 weeks | 0.70 |
| 4 weeks | 0.80 |
| 5 weeks | 0.82 |
| 6 weeks | 0.87 |
| 7 weeks | 0.92 |
| 8 weeks | 0.92 |
| 10 weeks | 1.03 |
| 12 weeks | 1.04 |
| 15 weeks | 1.15 |
| 19 weeks | 1.23 |
| 23 weeks | 1.38 |
| 25 weeks | 1.38 |
| 31 weeks | 1.45 |
| 33 weeks | 1.51 |

*Example II*

Into a reactor as described in Example I is placed 497 grams (1.75 equivalents) of distilled hydrogenated polymeric fat acids (prepared from tall oil fat acids) having the following analysis:

| | |
|---|---|
| Percent M | 3.0 |
| Percent D | 96.5 |
| Percent T | 0.5 |
| S.E. | 283 |
| N.E. | 290 |
| Iodine value (I.V.) | 37.6 |

124.3 grams (1.75 equivalents) of 1,4-cyclohexanebis (methylamine).

The mixture was heated 1.5 hours at 30–250° C., 1.75 hours at 250° C. and 1.75 hours under vacuum (ca. 1 mm. Hg) at 250° C. The resulting polyamide had the following properties:

| | |
|---|---|
| Amine _____ meq./kg __ | 30 |
| Acid _____ meq./kg __ | 10 |
| Ball and ring softening point ° C. | 130 |
| Inherent viscosity | 0.41 |
| Elongation percent | 320 |
| Tensile strength (p.s.i.) | 4,700 |

*Example III*

Using essentially the procedure of Example I, the following homopolymers of distilled polymeric fat acids having a dimeric content of greater than 95% dimeric species and 1,4-cyclohexanebis(methylamine) were prepared. Physical properties are listed below.

| Product | Ball and Ring Softening Point, °C. | Amine, meq./kg. | Acid, meq./kg. | Inherent Viscosity | Tensile Strength, p.s.i. | Elongation, percent |
|---|---|---|---|---|---|---|
| III-A | 152 | 28 | 46 | 0.59 | 4,800 | 380 |
| III-B | 152 | 29 | 35 | 0.58 | 4,500 | |
| III-C | 141 | 22 | 26 | 0.53 | 5,700 | 380 |
| III-D | 160 | 36 | 16 | 0.60 | 5,000 | 360 |

The preceding examples demonstrated the unique nature of the polyamides of the present invention which are tough compositions exhibiting excellent tensile strength compared with remarkable elongation properties. These polyamides exhibit tensile strength generally in excess of 4500 p.s.i., combined with elongations in excess of 300%. The polyamides have inherent viscosities in excess of 0.50 and ball and ring softening points of about 130° C. or higher. In addition to possessing the foregoing properties, the polyamides show surprising resistance to water absorption. The water absorption at room temperature after 30 weeks is generally below 2%. Thus the polyamides of the present invention possess a combination of the desirable properties never heretofore achieved in other polyamide compositions and provides high melting, tough and flexible compositions having improved resistance to water absorption.

The discussions herein have been limited to the components of the polyamide itself. This is not meant to be limiting as to the scope of the invention and it is understood that the composition may include stabilizers, anti-oxidants, pigments, fillers and the like.

The embodiments of the invention in which an exclusive property or privilege is claimed are defined as follows:

1. A tough, flexible polyamide composition consisting essentially of the condensation product at 150–300° C. of (A) an acid compound selected from the group consisting of polymeric fat acids and the alkyl esters thereof in which the alkyl group has from 1–8 carbon atoms, said acid compound having a dimeric fat acid content greater than about 95% by weight with (B) a diamine selected from the group consisting of 1,3-cyclohexane bis(methylamine) and 1,4-cyclohexane bis(methylamine), the molar equivalents of amine employed being essentially equal to the molar equivalents of carboxyl groups employed.

2. A polyamide composition as defined in claim 1 in which said acid compound is polymerized tall oil fatty acids and said diamine is 1,4-cyclohexane bis(methylamine).

3. A polyamide composition as defined in claim 1 in which said acid compound is polymerized tall oil fatty acids and said diamine is 1,3-cyclohexane bis(methylamine).

References Cited by the Examiner
UNITED STATES PATENTS

| | | | |
|---|---|---|---|
| 2,767,089 | 10/1956 | Renfrew et al. | 260—404 X |
| 2,908,584 | 10/1959 | Aelony | 260—404 X |
| 2,955,951 | 10/1960 | Aelony | 260—404 X |
| 3,002,941 | 10/1961 | Peterson | 260—404 X |
| 3,037,871 | 6/1962 | Floyd et al. | 260—404 X |

CHARLES B. PARKER, *Primary Examiner.*

JOSEPH P. BRUST, *Examiner.*